Figure 1:
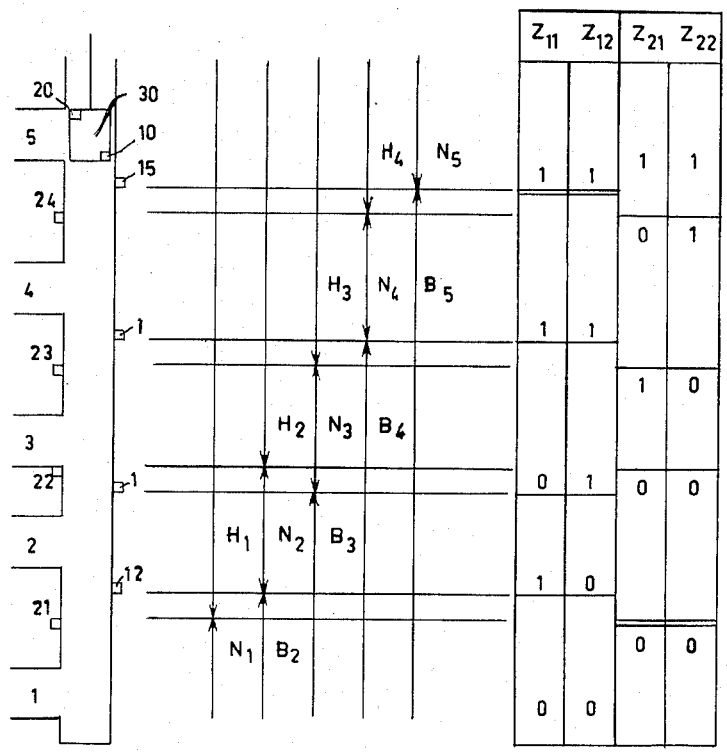

Dec. 14, 1965  A. LEJEUNE  3,223,200
ELEVATOR CONTROL SYSTEM EMPLOYING LOGICAL ELEMENTS
Filed Jan. 21, 1963  3 Sheets-Sheet 1

INVENTOR
André LEJEUNE
BY
ATTORNEYS

United States Patent Office 3,223,200
Patented Dec. 14, 1965

3,223,200
ELEVATOR CONTROL SYSTEM EMPLOYING LOGICAL ELEMENTS
André Lejeune, Mont-sur-Marchienne, Belgium, assignor to Ateliers de Constructions Electriques de Charleroi (ACEC), Brussels, Belgium
Filed Jan. 21, 1963, Ser. No. 252,879
Claims priority, application France, Jan. 23, 1962, 885,640
3 Claims. (Cl. 187—29)

The present invention relates to an assembly of devices which constitute an elevator control.

It is a purpose of the invention to provide a standardized assembly of control devices comprising a minimum of parts to be mounted along the path of the elevator cage.

A further object of the invention lies in the provision of a simple control logic which must be independent of the conditions particular to the elevator, in such a way that the various devices of the assembly may be mass-produced to become part of any elevator as constant elements thereof or as variable elements thereof but only in the case of secondary parts.

The elevator control according to the invention comprises devices detecting the passage of the elevator cage and other devices detecting the end of travel of the cage, preceding the top and bottom floors. The devices detecting the passage are sensitive to locating elements. One of these detecting devices emits control signals during the passage of the locating elements thus giving the locations where the stop devices for a descending cabin are to be actuated. Another of the detecting devices emits control signals during the passage of the locating elements to indicate the locations where the stopping devices for an ascending cage are to be actuated. An auxiliary control device emits, for each floor, three auxiliary signals characterizing respectively:

(1) The position of the cage in the zone located above the spot where the stopping device for a descending cage is to be actuated, (2) The position of the cage in the zone located below the spot where the stopping device for an ascending cage is to be actuated, and (3) The position of the cage between the two aforesaid spots.

The auxiliary control device may be actuated directly by the control signals emitted by the devices detecting the passage of the cage and by the devices detecting the end of travel as well as by a signal emitted by the hoisting motor, indicating the direction of travel.

According to another embodiment, the control device may be actuated by the significant signals available at the output of two meters. One of these meters is actuated by the signal indicating the direction of travel and by the signals emitted by the detecting device sensitive to the locating elements which indicate the locations where stop devices for an ascending cage must be actuated. The second of the two meters is actuated by a signal indicating the direction of travel and by the signals emitted by the detecting device sensitive to the locating elements which indicate the locations where the stop devices for a descending cage are to be actuated.

The elevator control may include several auxiliary control devices each cooperating with detecting devices for an ascending as well as a descending cage. In such a case, the auxiliary signals available at the output of each of these devices are applied in coincidence circuits where more varied control signals are produced, in order to allow more speed when the distance between the starting floor and the destination floor is sufficiently great.

The invention is described hereinbelow in relation to three examples of control operations and having reference to the annexed diagrammatic drawings.

The above description considers only the essential elements of the elevator control according to the invention and all reference to control and locking devices has been omitted in order to render the description clearer and more easily understood. It is easy for the man of the art to incorporate in the statement of principle set forth below the control circuits permitting, for instance, priority of a cage call over a floor call, locking controlled by the doors, automatic directing of the elevator cage towards a priority floor, distinguishing of floor calls between up and down calls, priority control by means of priority keys, etc.

Nor will the description consider variations in movement control such as the means used to obtain slowing down of the cage according to a predetermined law, etc.

In FIGURE 1, an elevator car 30 moves in an elevator shaft to serve several floors numbered 1 to 5. In this shaft are secured two series of locating elements 12 to 14 and 22 to 24. The elements of one of the series are located at the places where the stop devices for an ascending cage are to be actuated while the elements of the other series are disposed at places where the stop devices for a descending cage are to be actuated. These locating elements may, for instance, be small plates made of ferromagnetic metal. Elements 12 to 14 act on a passage detector 10 secured to car 30. Locating elements 22 to 24 act on a passage detector 20 secured to the cage at a location other than that of detector 10.

The relative distribution of the passage detectors and of the locating elements may be arranged differently. For instance, the passage detectors may be mounted in the engine room and the locating elements may be fixed to a cable or a band secured to the cage. When a passage detector 10 or 20 passes in front of a locating element, an impulse is generated in the detector. The impulses coming from the passage detector 10, sensitive to locating elements 12 to 14 for an ascending cage are applied to a first meter delivering significant output signals $Z_{11}$ and $Z_{12}$. Impulses coming from the passage detector 20, sensitive to locating elements 22 to 24 for a descending cage, are applied to a second meter delivering significant output signals $Z_{21}$, $Z_{22}$. The two meters operate alternatively in "addition" or in "subtraction" according to a signal emitted in relation to the direction of rotation of the hoisting motor (not showing) of the cage.

The locations of the locating elements are determined once and for all during the installation. In order to obtain an elevator displacement in accordance with the requirements of commercial use, the stop control must come into action at the time where the cage moves at running speed. If the cage, during its movement between neighbouring floors, did not reach a speed close to the running speed, the stop device would initiate braking of the cage prematurely and the latter would tend to stop before reaching the next floor so that a very important portion of its displacement would take place at the very low approaching speed.

Considering the separation of the locating elements for an ascending cage and the locating elements for a descending cage, the mounting of these elements is not affected by overlapping between locating elements for ascending and locating elements for descending. For instance, in FIGURE 1, the locating element 22 for the descent of the cage towards floor 2 is located above the locating element 13 for the ascent of the cage towards floor 3. On the other hand, the locating element 23 for the descent of the cage towards floor 3 is located above the locating element 14 for the ascent of the cage towards floor 4. If only one passage detector and only one series of locating elements were used, it would not be possible to use the same control logic for stops at floors 2, 3 and 4 since overlapping of the locating elements would have to be taken into account.

In the present example, five floors have been purposely selected in order to illustrate one of the particular and advantageous aspects of the embodiment using meters. It would appear that, with five floors, it would be necessary to have binary counters making it possible to count at least up to five, that is up to 8, but this is not so. It is only necessary, indeed, to use meters that can count up to 4, that is, the number of floors minus 1. Thus in the case of 33 floors, for instance, a meter may be used to count up to 32. This is made possible because stopping of the descending movement at the lowest floor is not controlled by signals obtained from the meters but by an end-of-travel detector 21 and, similarly, stopping of the ascending movement at the highest floor is controlled by an end-of-travel detector 15. These two end-of-travel detectors control stopping of the cage even if the floor meters are out of order, for instance, by failure of registering a metering impulse. The end-of-travel signals are used, not only for stopping the cage, but also for eventually controlling and rectifying the meter indications as known. It is to be noted that this control may take place at each end-of-travel of the cage whereas, usually it is provided at one end only.

$Z_{11}$, $Z_{12}$ were used to designate the significant output signals of the meter actuated by detector 10, sensitive to the locating elements 12 to 14, $Z_{21}$, $Z_{22}$ serve to designate the significant signals of the meter actuated by detector 20 sensitive to the locating elements 22 to 24, $N_1$ serves to designate the engagement of the end-of-travel detector 21 and $N_5$, the engagement of the end-of-travel detector 15. With the help of these significant signals $Z_{11}$, $Z_{12}$, $Z_{21}$, $Z_{22}$, $N_1$ and $N_5$, three series of auxiliary signals $H_1$, $H_2$, $H_3$, $H_4$; $B_2$, $B_3$, $B_4$, $B_5$; and $N_2$, $N_3$, $N_4$ are generated in an auxiliary device, for example, in the following manner:

$$B_2 = Z u_{11}' Z_{12}'$$
$$B_3 = B_2 + Z_{11} Z_{12}'$$
$$B_4 = B_3 + Z_{11}' Z_{12}$$
$$B_5 = N_5'$$
$$H_4 = Z_{21} Z_{22}$$
$$H_3 = H_4 + Z_{21}' Z_{22}$$
$$H_2 = H_3 + Z_{21} Z_{22}'$$
$$H_1 = N_1'$$
$$N_2 = H_2' B_2'$$
$$N_3 = H_3' B_3'$$
$$N_4 = H_4' B_4'$$

These auxiliary signals are available on 11 different outputs of the auxiliary control device.

The above equations are logical equations in Boolian algebraic notation. All the terms of these equations are either negative voltages, such as $-12$ v. or zero voltage. The man of the art knows how an electric control may be obtained according to these equations by means of well known devices called AND and OR logic blocks.

Thus defined, the auxiliary signals $H_1$, $H_2$, $H_3$, $H_4$ characterize the position of the cage in the zones located respectively above the end-of-travel detector 21 and the locating elements 22, 23, 24; the auxiliary signals $B_2$, $B_3$, $B_4$, $B_5$ characterize the position of the cage in the zones respectively located below locating elements 12, 13, 14 and below the end-of-travel detector 15, and the auxiliary signals $N_1$, $N_2$, $N_3$, $N_4$, $N_5$ characterize the position of the cage in the zones located respectively below 21, between 12 and 22, between 13 and 23, between 14 and 24 and above 25. The lands where signals $N_1$, $N_2$, $N_3$, $N_4$, $N_5$, $B_2$, $B_3$, $B_4$, $B_5$, $H_4$, $H_3$, $H_2$, $H_1$ are not nil, are illustrated diagrammatically by lines on the synoptical table of the drawing.

Auxiliary signals $H_1$, $H_2$, $H_3$, $H_4$, $B_5$, $B_4$, $B_3$, $B_2$, as well as $N_2$, $N_3$, $N_4$ created in an auxiliary control device are applied to a call memory device, in a stop control device and in control device for starting the motor. The principle of the call memory device may be characterized by the following fundamental formulas:

$$M_1 = N_1'K_1 + N_1'M_1$$
$$M_2 = N_2'K_2 + N_2'M_2 + A'K_2 + A'M_2$$
$$M_3 = N_3'K_3 + N_3'M_3 + A'K_3 + A'M_3$$
$$M_4 = N_4'K_4 + N_4'M_4 + A'K_4 + A'M_4$$
$$M_5 = N_5'K_5 + N_5'M_5$$

In these formulas, $M_1$, $M_2$, $M_3$, $M_4$, $M_5$ are call memory signals. Signals $K_1$, $K_2$, $K_3$, $K_4$, $K_5$ are signals coming from push buttons. A is the stop signal, $N_1$, $N_2$, $N_3$, $N_4$, $N_5$ are the above auxiliary signals. These formulas mean that the call represented by a signal $K_1$, $K_2$, $K_3$, $K_4$, $K_5$ remains registered as long as the cage is not in the zone $N_1$, $N_2$, $N_3$, $N_4$ or $N_5$ of the floor selected by the call or as long as there is no stop signal A.

The stop signal appears when there is coincidence between the call from the memorized floor and the registration of the position of the cage in relation to this floor.

$$A = N_2 M_2 + N_3 M_3 + N_4 M_4$$

The control signals for the two directions of rotation of the hoisting motor are defined as follows:

$$L_1 = L_2' N_5' (M_5 + M_4 B_4 + M_3 B_3 + M_2 B_2)$$
$$L_2 = L_1' N_1' (M_1 + M_2 H_2 + M_3 H_3 + M_4 H_4)$$

In these formulas, $L_1$ is the control of the ascent and $L_2$ is the control of the descent. $L_1'$ is the signal which tells the absence of ascending motion and $L_2'$ is the signal indicating the absence of descending motion. These formulas mean that the ascending movement of the cage (or the descending movement) is controlled when the reverse movement does not take place, when the cage is not at the highest floor (or the lowest one), when a call from one of the floors is recorded in one of the call memories and if the cage is located in the zone below (or above) the said floor.

The following example is a more general one where the meters do not intervene explicitly but are implicitly comprised in the logic circuitry of the auxiliary device. The auxiliary control signals are identified by the same references, with an index $n$ which may be equal to 1, 2, 3 . . . Z, 1 designating the lowest floor, 2 the following floor and so on until Z, the highest floor.

The auxiliary control signals are:

$Bn$, characterizing the position of the cage in the zone located below the place where the stop device of an ascending cage for floor $n$ is actuated $Hn$, characterizing the position of the cage in the zone located above the place where the stop device of a descending cage for floor $n$ is actuated $Nn$, characterizing the position of the cage in the neighbourhood of floor $n$, between the two aforesaid places.

The control signals emitted by the passage detectors, by the end-of-travel detectors and by the motor are:

$Im$, the control signals appearing during the passage of the locating elements indicating the places where the stop devices of an ascending cage must be actuated $Id$, the control signals appearing during the passage of the locating elements indicating places where stop devices of a descending cage are actuated $N_1$, the end-of-travel signal at the lowest floor $N_Z$, the signal of the end-of-course at the highest floor S is a signal appearing during the ascent of the cage S' is a signal reverse S appearing during the descent of the cage.

All these signals are applied to a logical control established, for instance, by means of AND or OR logic blocks, coordinated in such a manner as to agree with the following logical functions:

$$N_n = I_m S B_{n-1}' B_n + I_d S' H_{n+1}' H_n + H_n' B_n' + I_d S N_n + I_m S' N_n$$
$$B_n = I_m S' N_{n+1}' N_n + I_m B_n + S' B_n + N_n' B_n N_z' + N_1$$
$$H_n = I_d S N_{n-1}' N_n + I_d H_n + S H_n + N_n' H_n N_1' + N_z$$

The three auxiliary signals $N_n B_n H_n$ are thereafter used in the same manner as previously to serve as basis for the establishment of call memory signals, etc.

The invention is also applicable when the cage does not reach the running speed during its displacement between the closest floors. In such a case, it is only necessary to provide an auxiliary running speed, relatively small, which will always be reached and to set up two auxiliary series of locating elements and one pair of auxiliary passage detectors. A discriminating device must then be provided to allow a selection between the main running speed and the auxiliary runing speed.

It is thus obtained a first series of auxiliary control signals $B_n H_n N_n$ and a second series of auxiliary control signals $B_n^0 H_n^0$ and $N_n^0$. When these following signals are combined, the model $B_n B_n^0 = B_{ng}$, $B_n N_n^0 = B_{np}$, $H_n N_n^0 = H_{np}$, $H_n H_n^0 = H_{ng}$ and $N_n N_n^0 = N_n$, the higher running speed is automatically selected when the distance between the starting floor and the destination floor is sufficiently great.

Figure 2:
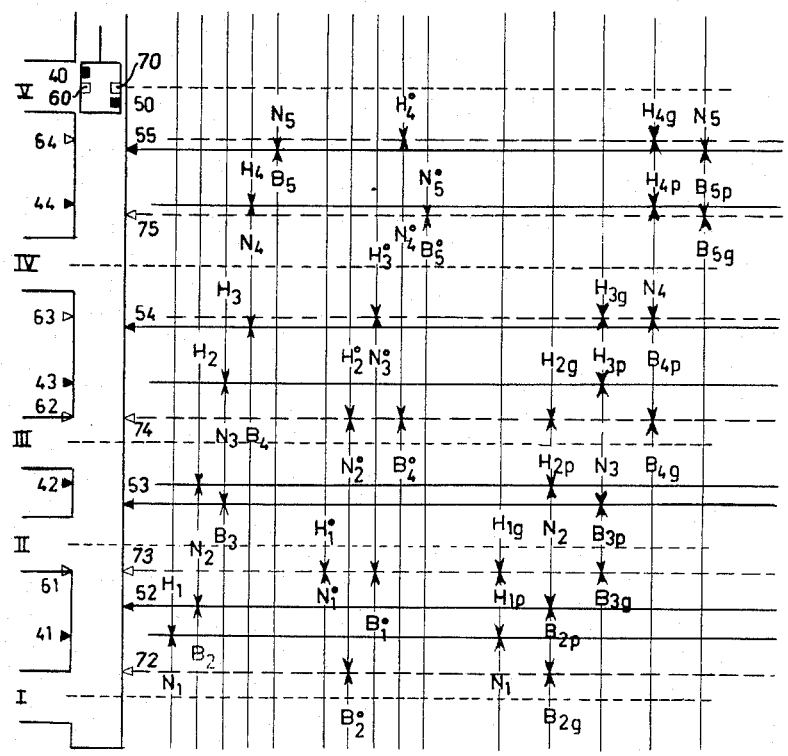
Figure 3:
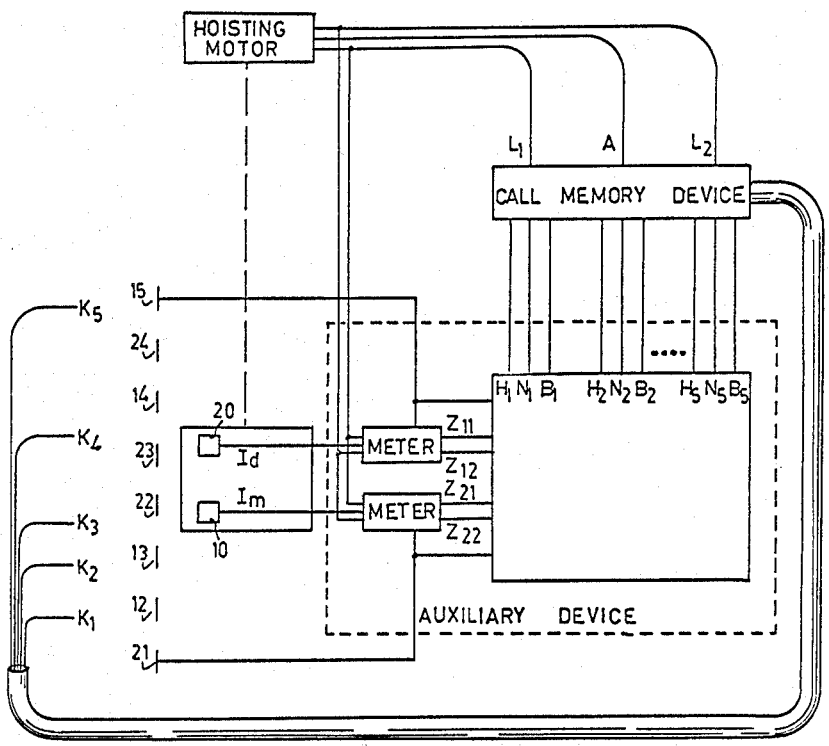

In FIGURE 2, an elevator cage serves floors I, II, III, IV and V. On the cage are located two passage detectors 40 and 50 cooperating with locating elements 41, 42, 43, 44 and 52, 53, 54, 55 and locating at places where the stopping devices are to be engaged during the lower running speed of the cage and two other passage detectors 60 and 70 cooperating with locating elements 61, 62, 63, 64 and 72, 73, 74, 75 arranged at places where the stop devices are to be engaged during the greater running speed. The locating elements 41, 42, 43, 44 and 61, 62, 63, 64 indicate the places where the stop device for a descending cage is to be brought into action, the other locating elements indicating the places where the device for an ascending cage are to be brought into action. On the diagrammatic sketch, synoptical at the right of FIGURE 2 are illustrated the functions $H_n B_n N_n$, $H_n^0 B_n^0 N_n^0$ as well as their combination $H_{ng} H_{np} N_n B_{np} B_{ng}$.

The locating plates are disposed at sufficient distance from one another to provide stopping of the cage in a progressive manner starting with the greater running speed without the cage having to move at the lower running speed. However, there is no inconvenience in having the cage brought back to the lower running speed if the distance between the starting floor and the destination floor is too small for the cage to reach, in starting up with the high speed control, the said speed and if it meets with the low running speed control before having reached the said low running speed or if it has slightly overpassed the said speed a little.

The embodiments of the invention in which an exclusive property or privilege is claimed are defined as follows:

1. An elevator control for an elevator system formed of an elevator car, a shaft and a hoisting motor for moving said car in said shaft, a stop device for stopping said car when ascending and a stop device for stopping said car when descending, said elevator control comprising:

(a) at least one first series of locating elements (12, 13, 14, 15) in said system for indicating the locations where said stop device for an ascending car must be controlled;
    (b) a first passage detector (10) in said system displaceable at the speed of the car in relation to the locating elements of said first series; said first passage detector cooperating with the locating elements of said first series;
    (c) at least one second series of locating elements (21, 22, 23, 24) in said system for indicating the locations where said stop device for a descending car must be controlled;
    (d) a second passage detector (20) in said system displaceable at the speed of the car in relation to the locating elements of said second series; said second passage detector cooperating with the locating elements of said second series;
    (e) a device for emitting auxiliary control signals:
        for each floor, except the bottom floor, at least one signal (B) indicating if the car is below the location where said stop device for an ascending car is actuated;
        for each floor, except the top floor, at least one signal (H) indicating if the car is above the location where said stop device for a descending car is to be actuated, and
        at least one signal (N) indicating if the car is between the above two locations;
    (f) said auxiliary control signal emitting device formed by logical circuits sensitive to the signals emitted by the passage detectors $I_m$ and $I_d$ and to a signal (S) indicating the direction of rotation of said hoisting motor;
    (g) a call memory device, in said assembly, to which said auxiliary control signals and call control signals ($K_1 K_2 K_3 K_4 K_5$) are applied; said call memory device emitting a hoisting signal (S), a lowering signal (S') and a stop signal for said hoisting motor.

2. An elevator control as claimed in claim 1, wherein the meters comprised in said device emitting auxiliary control signals are equal in number to the number of passage detectors.

3. An elevator control as claimed in claim 2, including end-of-travel detectors in said assembly to bring said meters to zero.

References Cited by the Examiner

UNITED STATES PATENTS

| | | | |
|---|---|---|---|
| 2,482,458 | 9/1949 | Bouton | 187—29 |
| 2,641,337 | 6/1953 | Lund | 187—29 |
| 2,711,799 | 6/1955 | Noon | 187—29 |
| 2,806,554 | 9/1957 | Hall et al. | 187—29 |
| 2,969,128 | 1/1961 | Jones et al. | 187—29 |
| 3,036,665 | 5/1962 | Kramer | 187—29 |
| 3,040,838 | 6/1962 | Suozzo et al. | 187—29 |
| 3,146,858 | 9/1964 | Leroux et al. | 187—29 |

FOREIGN PATENTS 890,733   3/1962   Great Britain.

ORIS L. RADER, *Primary Examiner.*